US008838140B1

(12) United States Patent
Ledet

(10) Patent No.: US 8,838,140 B1
(45) Date of Patent: Sep. 16, 2014

(54) SHARING A LIVE VIEW ON A MOBILE DEVICE

(75) Inventor: David Gerard Ledet, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 0 days.

(21) Appl. No.: 13/292,452

(22) Filed: Nov. 9, 2011

Related U.S. Application Data

(60) Provisional application No. 61/411,662, filed on Nov. 9, 2010.

(51) Int. Cl.
*G06F 3/00* (2006.01)
*H04W 24/00* (2009.01)
*H04M 3/00* (2006.01)
*G06F 15/16* (2006.01)

(52) U.S. Cl.
USPC ........ 455/456.2; 455/418; 455/419; 455/420; 725/37; 725/38; 709/231

(58) Field of Classification Search
CPC ........ G06Q 50/01; H04L 65/60; H04L 67/18; H04L 67/16
USPC ........ 455/418, 419, 420; 709/231; 725/37–38
See application file for complete search history.

(56) References Cited

U.S. PATENT DOCUMENTS

| | | | | |
|---|---|---|---|---|
| 2009/0143056 | A1* | 6/2009 | Tang et al. | 455/418 |
| 2009/0148124 | A1* | 6/2009 | Athsani et al. | 386/46 |
| 2009/0187466 | A1* | 7/2009 | Carter et al. | 705/10 |
| 2010/0319023 | A1* | 12/2010 | Ko et al. | 725/37 |
| 2012/0042036 | A1* | 2/2012 | Lau et al. | 709/217 |
| 2012/0303834 | A1* | 11/2012 | Adam et al. | 709/231 |

* cited by examiner

*Primary Examiner* — Inder Mehra
(74) *Attorney, Agent, or Firm* — Haynes and Boone, LLP

(57) ABSTRACT

Disclosed are a method and apparatus configured to communicate between mobile devices. One example method may include determining a present location of a mobile device being operated by a user, determining a present location of at least one additional mobile device being operated by at least one additional user via a location based service (LBS) and notifying the mobile device when the present location of the at least one additional mobile device is within a predefined threshold distance of a mobile device domain. The method may also include receiving media data captured from the at least one additional mobile device and forwarding the received data to the mobile device. The user of the mobile device may be able to track, maintain communication, and identify the locations and activities of friends, family, and other persons of interest via their respective mobile devices.

17 Claims, 9 Drawing Sheets

```
AVCaptureSession *captureSession = [[AVCaptureSession
alloc] init];

AVCaptureDevice *videoCaptureDevice = [AVCaptureDevice
defaultDeviceWithMediaType:AVMediaTypeVideo];

NSError *error = nil;

AVCaptureDeviceInput *videoInput = [AVCaptureDeviceInput
deviceInputWithDevice:videoCaptureDevice error:&error];

if (videoInput) {

[captureSession addInput:videoInput];

} else {

// Handle the failure.
}
```

SHARING A LIVE VIEW ON A MOBILE DEVICE

CROSS-REFERENCE TO RELATED APPLICATIONS

The instant application claims priority to provisional application No. 61/411,662, filed Nov. 9, 2010, entitled "SHARING A LIVE VIEW ON A MOBILE DEVICE", the entire contents of which are hereby incorporated by reference herein, and to provisional application No. 61/354,307, filed on Jun. 14, 2010, entitled "MEDIA FILES IN VOICE-BASED SOCIAL MEDIA", and application Ser. No. 13/095,981, filed on Apr. 28, 2011, entitled "MEDIA FILES IN VOICE-BASED SOCIAL MEDIA", and provisional application No. 61/317,788, filed Mar. 26, 2010, entitled "DYNAMIC COLLABORATION AND DOCUMENT-MANAGEMENT PLATFORM", and application Ser. No. 12/913,848, filed on Oct. 28, 2010, entitled "METHOD AND SYSTEM FOR GENERATING AN ELECTRONIC MEDIUM", and application Ser. No. 12/913,852, filed on Oct. 28, 2010, entitled "METHOD AND SYSTEM FOR SEARCHING NETWORK RESOURCES TO LOCATE CONTENT", and application Ser. No. 12,913,854, filed on Oct. 28, 2010, entitled "METHOD AND SYSTEM FOR PRIORITIZING CONTENT COLLECTED AUTOMATICALLY", and application Ser. No. 12/913,856, filed on Oct. 28, 2010, entitled "METHOD AND SYSTEM FOR COMMUNICATING WITH INTERNET RESOURCES TO IDENTIFY AND SUPPLY CONTENT FOR WEBPAGE CONSTRUCTION, and application Ser. No. 13/053,767, filed on Mar. 22, 2011, entitled "METHOD AND SYSTEM FOR GENERATING AN ELECTRONIC MEDIUM", the entire contents of which are hereby incorporated by reference.

BACKGROUND OF THE INVENTION

There exists technology in the market today allowing users of mobile devices to keep track of other users. The use of Global Positioning Systems (GPS) gives the mobile device users the capability for applications to be aware of the mobile device. These systems are able to track mobile devices to a location accurate to 5 meters. Many applications on the mobile devices (called Apps) utilize the GPS location technology to provide Location Based Services (LBS) to their users. These apps allow users to find locations of interest, locations of their friends, provide transportation directions, among other uses.

When using LBS to keep track of other mobile devices, existing apps are able to make the user aware of their friends that may be near their location. This functionality can be useful for example, if a businessman is traveling to another city and desires to either meet an acquaintance, or determine if one of their friends are in the city, or are nearby.

Advanced mobile devices (henceforth referred to as smart phones), in addition to having LBS also have cameras that can act as video cameras. Many of the smartphones are able to record hi-definition video (720p and above) in an easy manner, but most are at least capable of recording VGA quality (640×480) video. System built apps allow the user to easily point the mobile device and record video.

Smartphones regularly utilize the camera to not only take photographs and video, but to also "look" at the image being captured by the camera to do other functions. For example, using a Shopper App, a smartphone may allow the user to point the camera at a barcode wherein the app will automatically scan the barcode in the image and provide purchasing information of the product found. Other information can also be obtained on the product such as reviews of the product, stores near the user that sell the product along with the current price. While this is useful for the user, it is worth noting that the camera on the smartphone is not always used for capturing photos or video, but is used as a "window" used by the app.

This window functionality is useful, and can be utilized in new ways. The current disclosure utilizes this "window" functionality in a social network scenario. The application of the current invention allows the user to not only to be made aware of acquaintances near them using the GPS functionality on the smartphone, but to also view what the acquaintance(s) are seeing through their smartphones.

SUMMARY OF THE INVENTION

According to one example embodiment, a method of communicating between mobile devices is disclosed. The method may include determining a present location of a mobile device being operated by a user, determining a present location of at least one additional mobile device being operated by a respective at least one additional user via a location based service (LBS) and notifying the mobile device when the present location of the at least one additional mobile device is within a predefined threshold distance of a mobile device domain. The method may also include receiving media data captured from the at least one additional mobile device and forwarding the received data to the mobile device.

According to another example embodiment of the present invention, an apparatus may be configured to communicate between mobile devices. The apparatus may include a processor configured to determine a present location of a mobile device being operated by a user, and determine a present location of at least one additional mobile device being operated by a respective at least one additional user via a location based service (LBS). The apparatus may also include a transmitter configured to notify the mobile device when the present location of the at least one additional mobile device is within a predefined threshold distance of a mobile device domain, and a receiver configured to receive media data captured from the at least one additional mobile device and forwarding the received data to the mobile device.

The current invention discloses methods that provide enhanced functionality on a smartphone wherein a "view" of a user's smartphone can be seen by other users that are connected to the user through the application of the current invention. This view is captured through the camera on the smartphone.

In one embodiment of the current disclosure, acquaintances near the user (through the use of LBS) are discovered and the live image that is being captured by the acquaintance's smartphone is able to be viewed by the user. This allows the user to not only know that their acquaintance is near their location, but also allows the user to view the image being captured. This functionality enhances social networking by allowing users to feel more connected by not only knowing their acquaintance's location, but also gives them the view of their acquaintance's smartphones.

If the user's smartphone as a front facing cameras in addition to the camera on the back of the phone, this camera is also utilized by the application of the current invention. This front-facing camera is for video calls, so that the image of the user can be seen by the other user on the video call. This front-facing camera is used in the application of the current invention. The image of the user (using the front-facing camera) is sent along with the video of the rear camera. The image of the user is shown in a small square on the bottom left of the video.

In another embodiment of the current disclosure, a group functionality is described. The user of the application of the current invention can setup a group and invite other acquaintances to be part of the group. The acquaintances will receive a notification to join the group, and they can enter into the group via their smartphones. Once a group is established, members of the group all see the same live image being captured.

In addition to the user seeing a live view from an acquaintance, audio is also able to be sent and received. Therefore, communication can be made between the user and the acquaintance. For example, the user connects to an acquaintance and views the acquaintance's live video feed from the acquaintance's smartphone. The user can comment on the view, and bi-directional communication takes place between the user and the acquaintance. If a group has been established, all users in the group hear the comment, and can comment as well. The voice from all users is sent to the smartphones of all users in the group, and the users in the group can discuss through the application.

In another embodiment of the current disclosure, as the user of the smartphone travels, acquaintances of the user that are registered by the application, and who are near the geographic area of the user, are made aware by notifying the user via a notification, for example a sound, an image, or any other functionality regularly used to notify a user.

In another embodiment of the current disclosure as the user views a map of the current location, acquaintances near the user and are registered with the application of the current invention, the acquaintances are visually depicted by an icon on the map. As the user touches the icon of the acquaintance, a menu is displayed with the following options:

View information about the acquaintance
Send the acquaintance a SMS message
Call the acquaintance
Switch view The last option, "Switch view", reflects the functionality depicted in the current invention. When "Switch view" is chosen, the user's smartphone displays the live video of the acquaintance's device, and the face of the acquaintance if the acquaintance's smartphone contains a front-facing camera.

In another embodiment of the current invention, the user is able to record the live video from the acquaintance's smartphone, then send the video to anyone through regular messaging functionality on the smartphone.

In another embodiment of the current invention, when the user of the current invention is traveling, acquaintances who are registered with the application and who are within a previously determined range are automatically connected by the application. The acquaintance's live view is able to be seen by the user of the application once the connection has been accepted by the user. The user's name is displayed at the top of the live view so that the user will be aware of the acquaintance who is providing the live view. This allows the user to know that the acquaintance is nearby. If an acquaintance is not within the predetermined range, the user of the application must request to see their live view.

In another embodiment of the current invention, the application allows the user to be "connected" to the acquaintance, or acquaintances with a persistent connection. This allows the connected users to speak to each other without having to utilize a voice channel through the cellular network. The ability to maintain a persistent connection is depicted in provisional application No. 61/354,307, filed on Jun. 14, 2010, entitled "MEDIA FILES IN VOICE-BASED SOCIAL MEDIA", and application Ser. No. 13/095,981, filed on Apr. 28, 2011, entitled "MEDIA FILES IN VOICE-BASED SOCIAL MEDIA".

In another embodiment of the current invention, functionality is present to upload a photo, video, or voice to social networking sites. This functionality is presented to the user by a menu button on the user's smartphone, or a button on the live video in the display. When the button is pressed, the application begins to record the video and stored on the user's smartphone. After the button is pressed, another button is presented that, when pressed, stops the recording. The user can then choose which social networking site to upload the recorded video by additional buttons presented to the user on the display.

In another embodiment of the current invention, the user of the application presses a button on the display to send a photo to a social networking site. This allows the user to upload a screen shot of the live view on the display which will be uploaded to a social networking site. In addition to uploading a screen shot of the live view, the user has the option to also speak into the application, and the speech is converted to text, which is also uploaded to the social networking site.

Walkthrough of an Example

UserA is using the application of the current invention. UserB, and UserC are acquaintances of UserA. UserA views the map in the application, and notices UserB on the map. UserA touches the icon of UserB on the map. In the menu, UserA chooses the "Switch View" item. The video from UserB's smartphone is displayed on UserA's smartphone along with UserB's face in a box on the bottom left of the video. UserA then comments on the view and UserB responds to the comment.

UserA then adds UserC to the group. UserC accepts the request to join the group and UserB's view is shown on UserC's smartphone. UserC then can speak and UserA and UserB hears the voice and can communicate with each other through the application.

BRIEF DESCRIPTION OF THE DRAWINGS

FIG. 5A shows a code segment capturing video on a user's smartphone.

DETAILED DESCRIPTION OF THE INVENTION

The application of the current invention allows friends to share a view of where they are with other friends in the immediate network, or share a view from their mobile device when desired.

The application allows a user to include friends, or heretofore indicated as acquaintances, in the application, and how those acquaintance's views on their mobile devices share their live views with the user. The user configures the geographic domain of the mobile device wherein if any of the acquaintances enter into the domain, the user is made aware of it, and then are able to see the view from the acquaintance's camera. The live view can be accepted automatically, or the user can choose to accept, or deny the live view.

The application also allows the user to request to view an acquaintance's live view when the acquaintance is not in the immediate geographic domain of the user as well.

Figure 1:
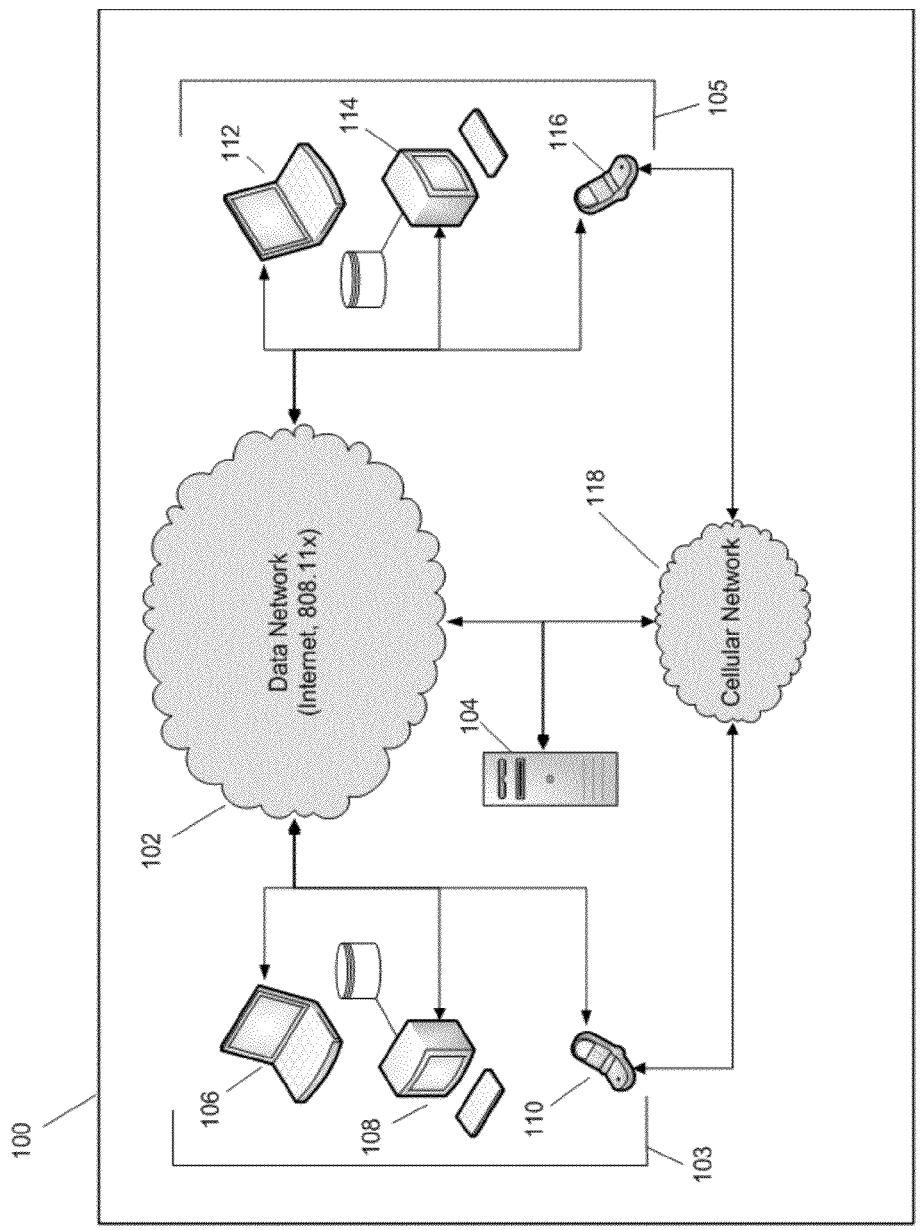
FIG. 1 shows a network view of the application of the current invention.

FIG. 1 below depicts a network diagram of how the application of the current invention resides in relation to the cellular network and the Internet.

FIG. 1 displays the network architecture of the present invention. This invention allows a user utilizing a client machine 103 to access the current invention (in the form of software, for example) to be downloaded from the server 104 or that currently resides on the client's machine 103. The client machine can be any of a mobile laptop device 106, a personal desktop computer 108, or a cellular device 110. The client machine 103 is connected to the Internet 102.

For the purposes of this disclosure, it is assumed that the application of the present invention resides on the server 104. The user of the current invention will be accessing the client machine 103, and connecting to a remote 105 machine. The remote can be accessed via any of a mobile laptop device 112, a personal desktop computer 114, or a cellular device 116. The remote 105 is connected to the Internet 102. If the client is on a cellular device 110/116, the server 104 can be accessed via the Internet 102, or the Cellular Network 118. It should be noted that other types of devices, in addition to devices 103 and 105, might be used with the present invention. For example, a PDA, an MP3 player, a gaming device (such as a hand held system or home based system) and the like that can also transmit and receive information could be used with the present invention.

The user of the invention will interface through an application that is accessed via one or more of the devices 103. In addition to the GUI located at the client's location 103, the application will communicate with functionality located on the server 104 through either the Internet 102, or the cellular network 118.

Registering Acquaintances

The user of the current invention registers acquaintances in the configuration area of the application. The acquaintances are able to be obtained by social networking sites, for example FaceBook. in FaceBook, methods are exposed in the published API giving the ability to examine all of the comments of users that are friends of a user in Facebook. The following are some of the methods (in the Facebook API) allowing this functionality:

friends.get—Returns the identifiers for the current user's Facebook friends.

stream.getComments—This method returns all comments associated with a post in a user's stream.

users.getInfo—Returns a wide array of user-specific information for each user identifier passed, limited by the view of the current user.

comments.add Adds a comment for a given xid on behalf of a user. Calls with a session secret may only act on behalf of the session user.

Using these and other published methods, the user's acquaintances are available for use by the current application.

The user chooses the desired acquaintances and includes them in the application. The acquaintances are stored in the server 104 of the application.

Use of Location Based Services

The user of the current invention is connected to acquaintances through the user of LBS. LBS utilizes GPS technology to track the location of the user and the user's acquaintances. LBS associates the application of the current invention with the device's geographic location. Mobile devices interact LBS with mapping functionality on the device. In order for LBS to be active on the mobile device, location services must be active on the device. This allows the mobile device to sync up with location satellites which provide location data from the geolocation service. This service cannot be turned on remotely, but only by the user of the mobile device. Some of the procedures available to query location sources are shown in FIG. 1A.

Figure 1A:
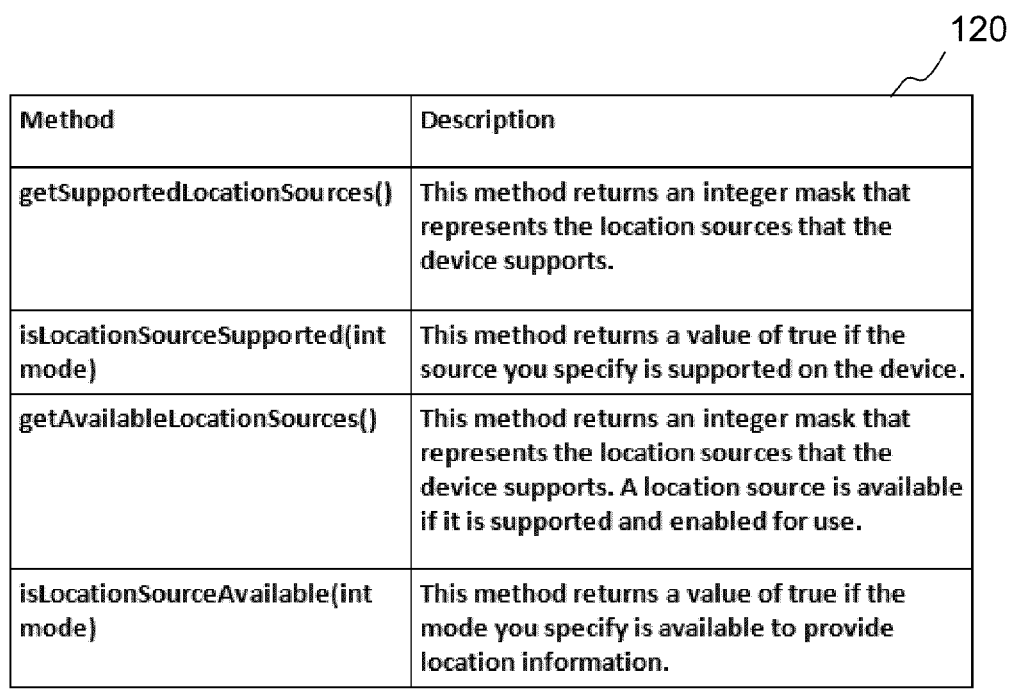
FIG. 1A shows Location based methods utilized in the application of the current invention.

In FIG. 1A, table 120 provides methods which are utilized to obtain the location sources for the mobile device. These sources are then used, in addition to GPS modes to query the location of the mobile device.

Figure 2:
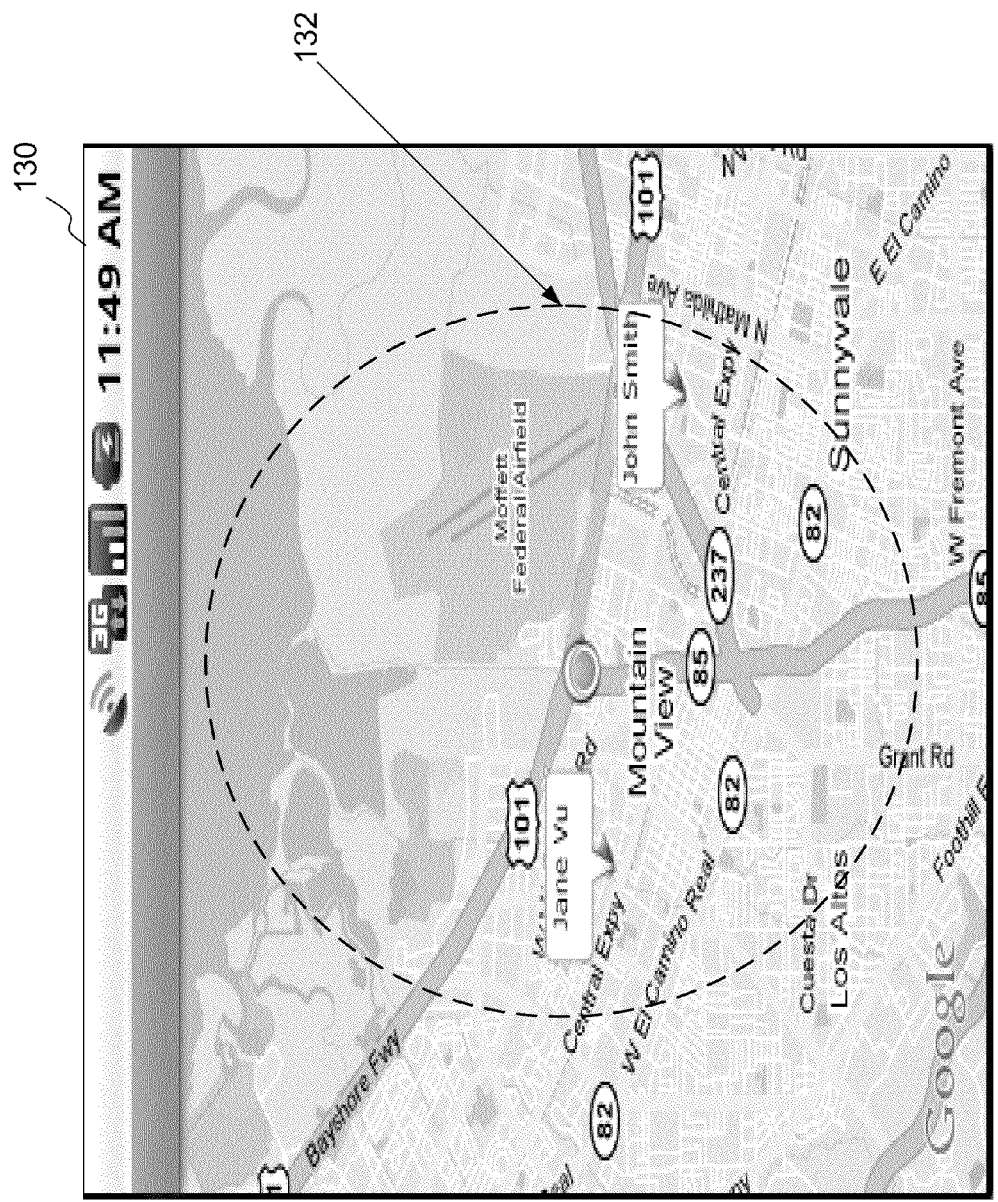
FIG. 2 shows a depiction of a map view on the user's smartphone of the application of the current invention.

The user is able to see the acquaintances who may be nearby on the user's map depicted on the screen of the user's smartphone. FIG. 2 depicts a map on the user's smart phone with acquaintances nearby via GUI 130. In FIG. 2, the user of the current invention is shown as a green dot in the middle of the map. There are two registered acquaintances near the user, Jane Vu and John Smith. The user is able to touch the name of an acquaintance in the map and perform certain functions with that acquaintance. The user's domain is illustrated by the geographic area defined by the dotted line 132.

Configuring the User's Domain

The user is able to configure the geographic area of the smartphone. This geographic area, heretofore referred to as the domain, is the distance from the user's smartphone that the user wishes to be made aware of if an acquaintance in the application comes within that distance.

In the configuration area of the application (not depicted), the user enters the amount of distance from the smartphone for the domain. The user is able to choose between yards, miles, or meters as the units of distance. This domain is able to be configured at anytime by the user of the application.

Interacting with Acquaintances

Figure 3:
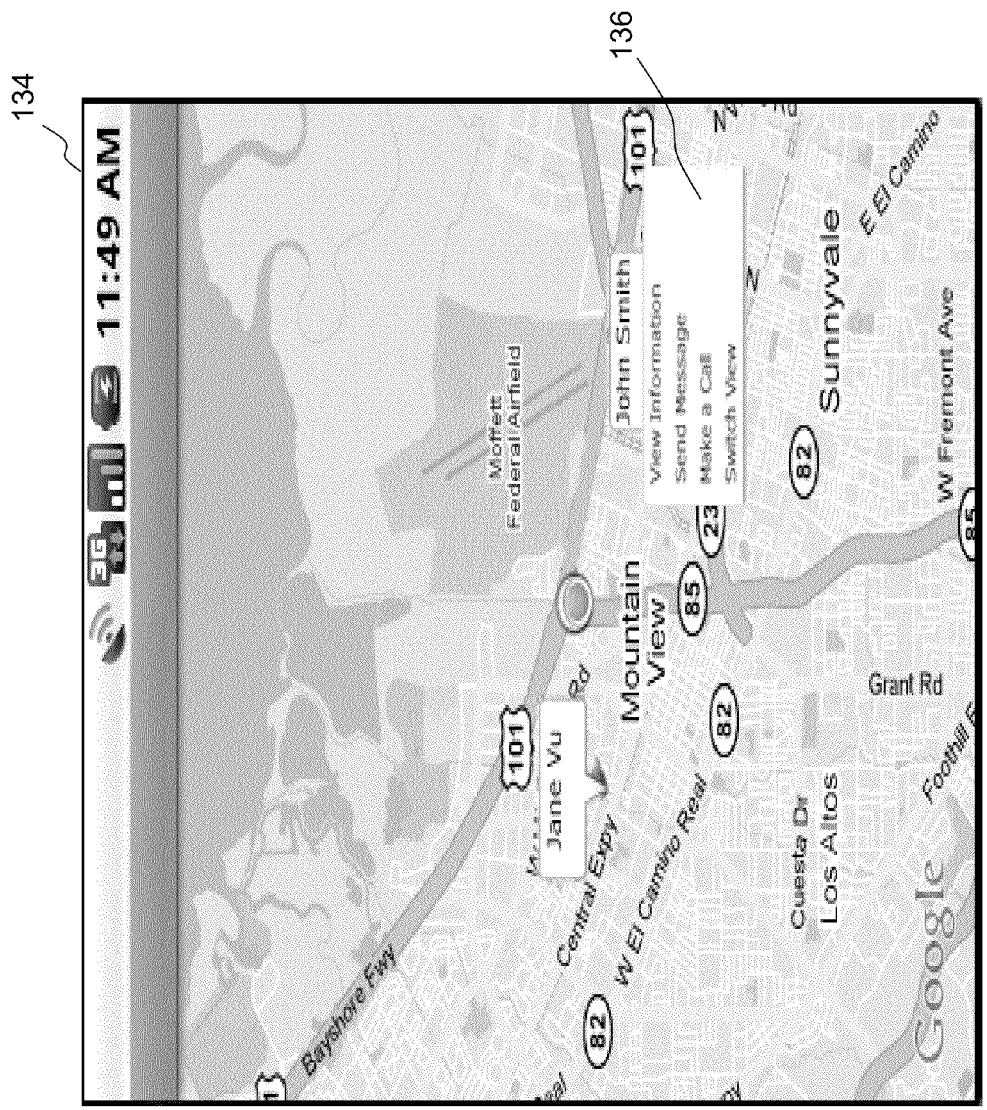
FIG. 3 shows a depiction of a menu accessed when touching on an acquaintance in the map view of the application of the current invention.

Acquaintances that are on the user's map can be interacted with by touching the white bubble appearing over the acquaintance's location. In one embodiment of the invention, the user is able to send a text message, call, or request to see the acquaintance's live view. FIG. 3 shows the menu displayed 134 when the user touches the acquaintance's name on the map.

In FIG. 3, the acquaintance, John Smith, has been touched. A menu appears below the name 136 allowing the user to choose various functions to interact with the acquaintance.

When the "View Information" list item is chosen, any information of the acquaintance is displayed on the screen (not depicted). This information can be a picture of the acquaintance, email address, data from social networking sites like their current status, or a link to their social networking site, mobile and other phone numbers, as well as any other information that can be functionally obtained by someone versed in mobile phone/social networking programming technology.

When the "Send Message" list option is chosen, the normal Short Messaging Service (SMS) protocol is utilized by the application and the user is able to send a SMS message to the acquaintance.

When the "Make a Call" list option is chosen, the user is then able to establish a mobile call to the acquaintance.

When the "Switch View" list item is chosen, the application attempts to display the live view from the acquaintance's smartphone. The application sends a notification to the acquaintance's smartphone stating that a request for a "Switch View" has been received (not depicted). The acquaintance has the option to accept or deny the request. If the acquaintance denies the request, the application sends a notification to the user indicating that the request to switch view has been denied.

Communication between the server and the clients (the user and the acquaintances) are made through services that send data from servers to their applications on the smartphones.

One popular smartphone operating system is Google's Android Operating System. A messaging framework called Android Cloud to Device Messaging (C2DM) is a service for sending messages from the server to the Android devices. The service provides a simple mechanism that servers can use to tell mobile applications to contact the server directly, to fetch updated application or user data. The C2DM service handles all aspects of queueing messages and delivery to the target application running on the device.

In order to send a message to a device, the following must be in place:

The application must have a registration ID that allows it to receive messages for that particular device, has the registration ID stored, and an authorization token must be in place.

The ClientLogin token authorizes an application server to send messages to a particular Android application. An application server has one ClientLogin token for a particular 3rd party app, and multiple registration IDs. Each registration ID represents a particular device that has registered to use the messaging service for a particular 3rd party app.

Here is the sequence of events that occurs when the application server sends a message:

The application server sends the message to C2DM servers.

Google enqueues and stores the message in the case the device is inactive.

When the device is online, Google sends the message to the device in case the device was not ready to receive the message.

On the device, the system broadcasts the message to the application via Intent broadcast with proper permissions, so that only the targeted application gets the message. This wakes the application. The application does not need to be running beforehand to receive the message.

The application processes the message.

An application can unregister C2DM if it no longer wants to receive further messages.

Using a messaging service such as C2DM, the server 104 with the application of the current invention can communicate with the user and the user's acquaintances.

Automatic Notification of Acquaintances in the User's Domain

Figure 4:
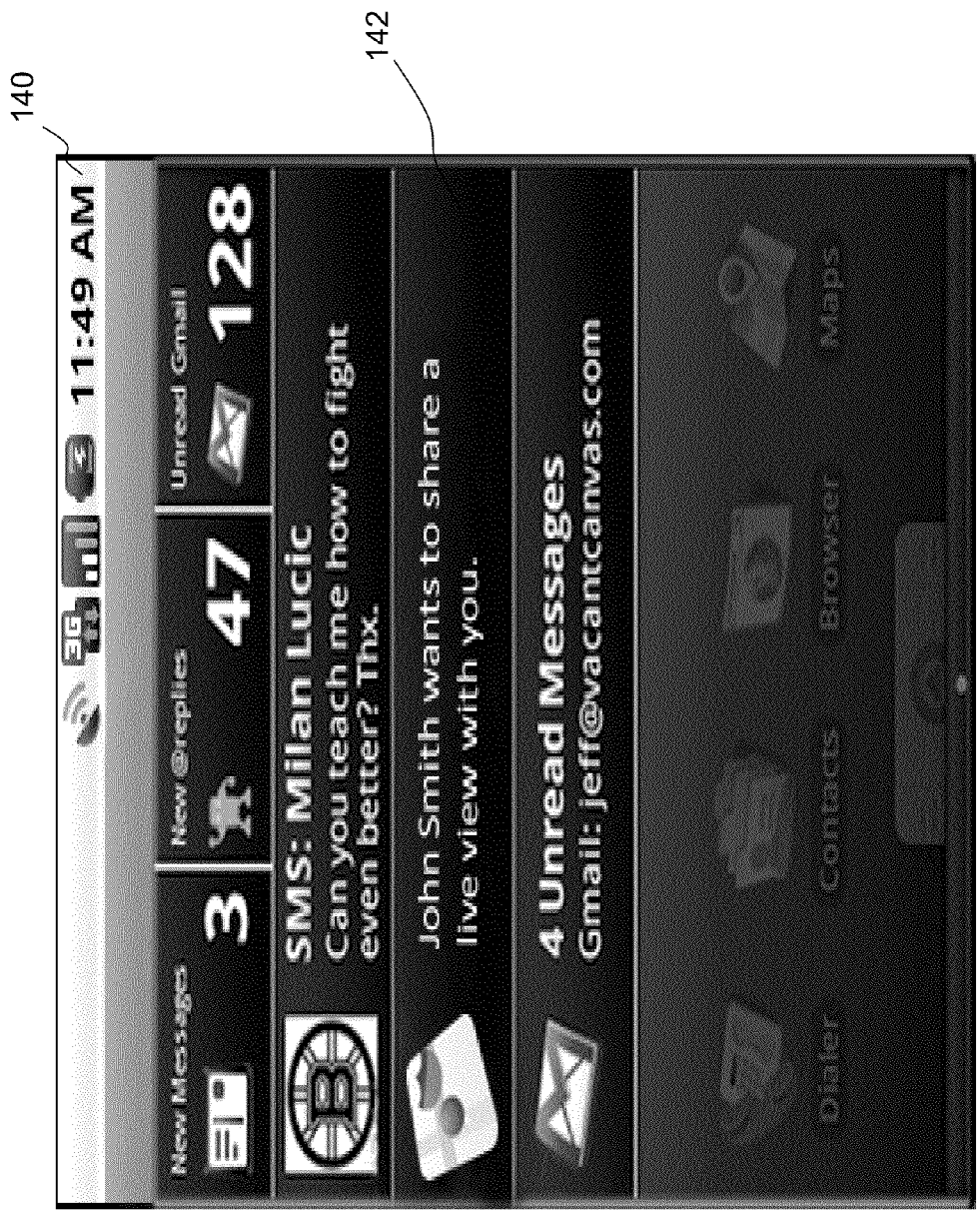
FIG. 4 shows a depiction of the incoming notification to receive a live view from an acquaintance of the application of the current invention.

As the acquaintance enters the domain of the user, a notification is sent to the user indicating that the live view is available from a nearby acquaintance. The server 104 running the application of the current invention, utilizing LBS technology, is aware of the geographic location of the user, as well as all of the acquaintances registered with the system. When an acquaintance enters the domain of the user, the application will be made aware of this, and automatically notify the user. FIG. 4 depicts an incoming notification that the acquaintance John Smith is nearby the user.

FIG. 4 depicts an Incoming notification from John Smith 142 via a user notification screen 140 of the mobile device. The application has noticed that John Smith is inside the geographic domain of the user and is a registered user of the application. The system automatically sent a notification to the user.

Figure 5:
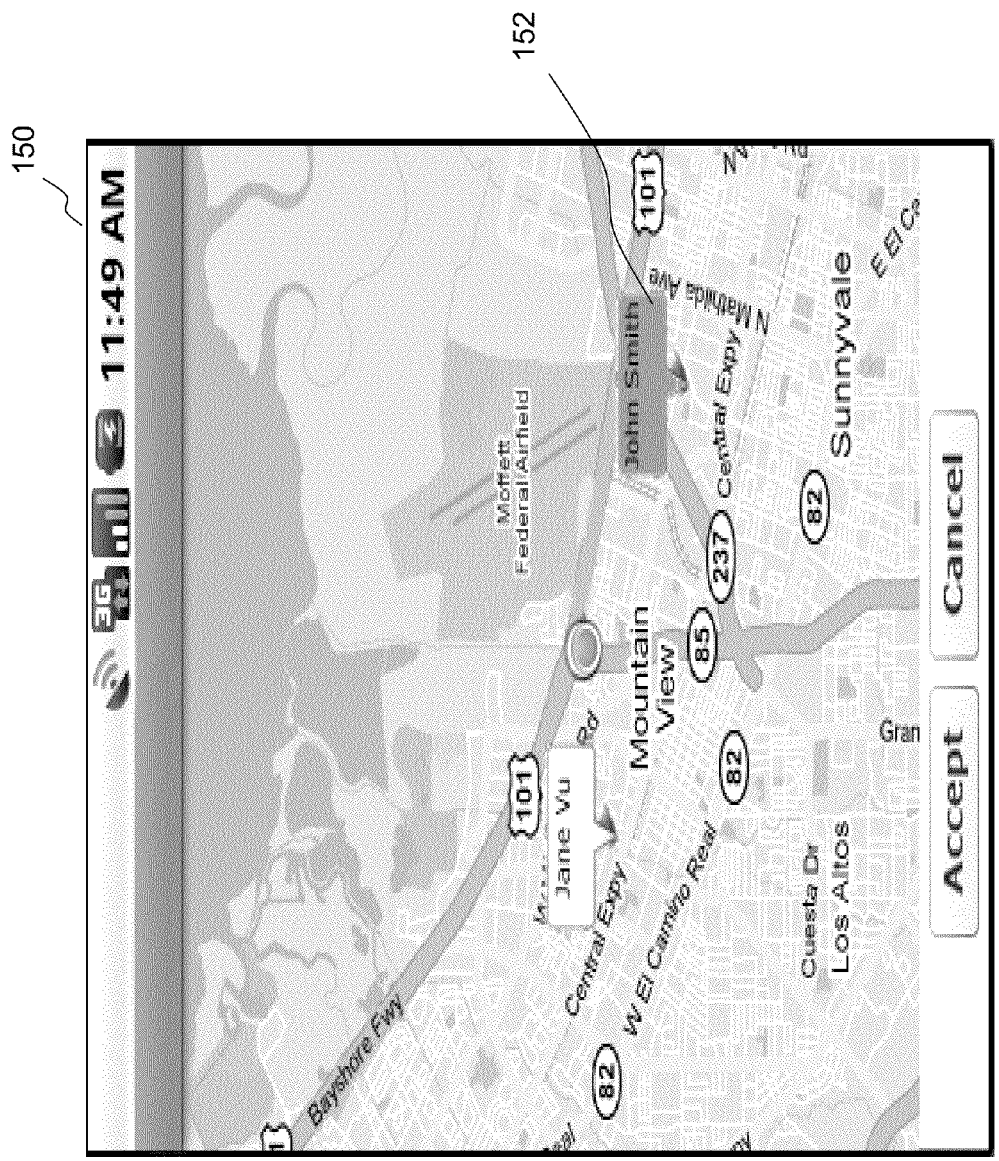
FIG. 5 shows a user's smartphone wherein the user is receiving a request to share a live view.

When the notification is touched, the application brings up the map view in the user's display with a menu as depicted in FIG. 5.

In FIG. 5, the map is depicted that is displayed to the user in display 150 when the notification is touched. John Smith's location identifier has changed colors 152 to a red tint indicating that the notification was received from that acquaintance. At the bottom of the map, a button bar is present with two buttons. The user can choose the "Accept" button to begin to view John Smith's live view, or the "Cancel" button can be pressed to return the map back to the original state.

If the "Accept button is pressed, the live view is presented to the user. The live view is obtained from the smartphone of John Smith.

In another embodiment of the current invention, the user has the option to specify a location on a map view by touching the map. When the map is touched, a menu appears, and the user is able to select "Location of Interest". Once the "Location of Interest" has been selected, a red circle is placed at that point in the map indicating to the user that the location specified is the geographic location of interest. When any of the user's acquaintances are in the geographic domain of the location, their live view is automatically sent to the user.

For example, let us assume that a group of friends are going to a concert. The user specifies on the map the location of the concert on the map. When any of the acquaintances are in the geographic location of the concert venue, their live view is automatically sent (or sent after the acquaintance gives permission to the application) to the user. The user is then able to see the live view of the venue, and may be able to see the amount of concert-goers in a line outside the venue, or simply see the live view of the front of the venue, etc.

The live view that is shown is received from John Smith's smartphone. The video feed of the live view is piped through the server 104 running the application of the current invention.

Capturing video from the smartphone is supported by Application Programming Interfaces (API) made available by the developers of the smartphone's operating system. For example, in Apple's iPhone operating system, you can record from a device's camera and display the incoming data live on screen. You use AVCaptureSession to manage data flow from inputs represented by AVCaptureInput objects (which mediate input from an AVCaptureDevice) to outputs represented by AVCaptureOutput.

Figure 6:
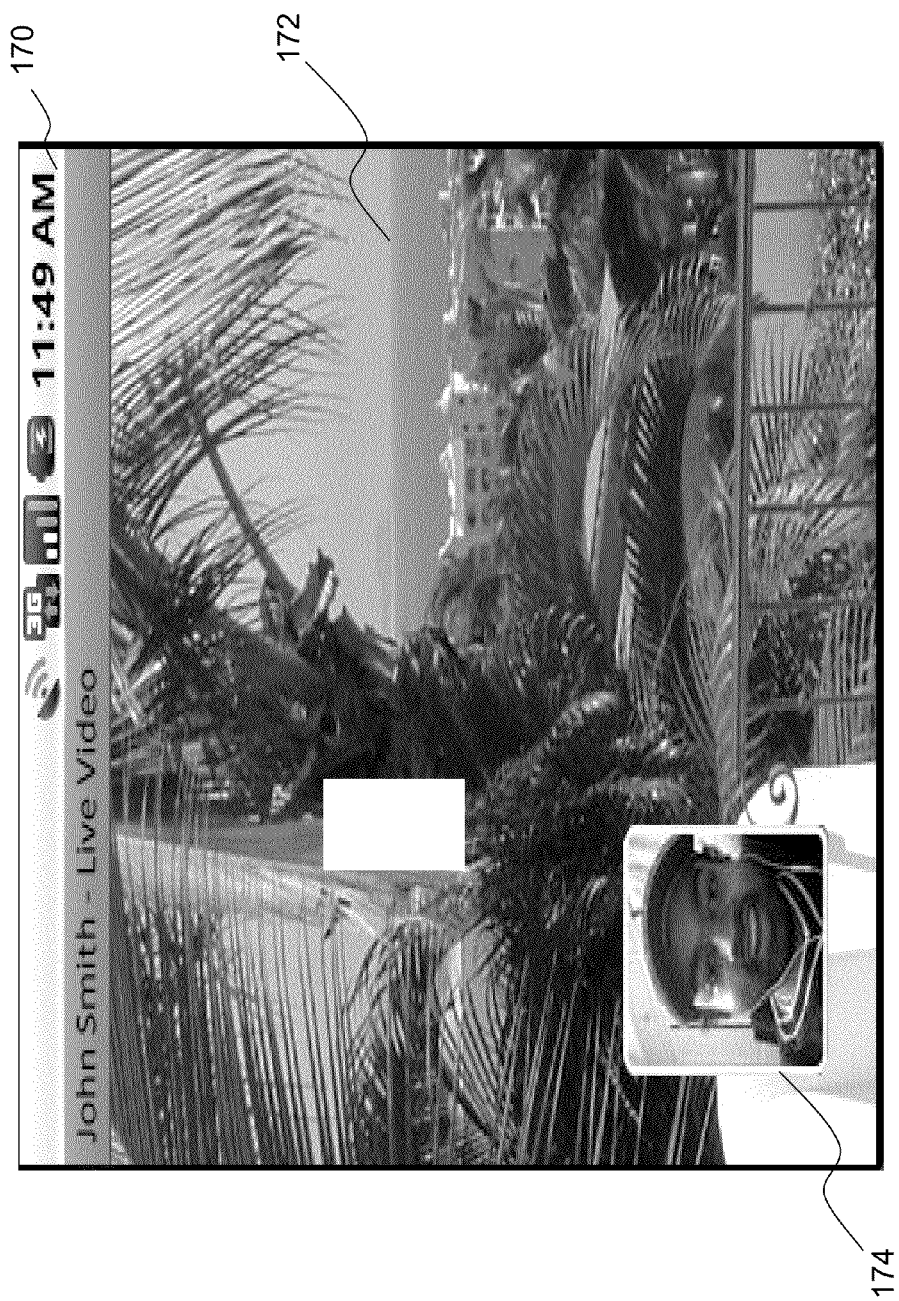
FIG. 6 shows a depiction of the user's smartphone displaying a live view of an acquaintance.

The AVCaptureSession class allows the coordination of the flow of data from the AV input device to outputs. In order to capture real-time video, the AVCaptureSession object is instantiated and appropriate inputs and outputs are added. The following code segment illustrates the configuration to capture video from the device:

When the video is captured, application of the current invention on the acquaintance's smartphone sends the data to the server 104 and back to the user's smartphone 103. If the acquaintance's smartphone contains a front-facing camera, the image from the front-facing camera is also delivered to the user and is displayed in a small dedicated area on the bottom left of the live view. FIG. 5A illustrates a code segment used to capture video from a user mobile device. FIG. 6 depicts a view interface 170 that is presented to the user.

In FIG. 6, the live view of John Smith as it is presented on the user's smartphone is shown to include a first camera view 172 and an additional camera view 174 combined into a single camera view. The title bar on the top of the live view shows that the user is viewing John Smith's live view. Also, the box on the bottom left shows an image of John Smith, as his smartphone also has a front facing camera. At this point, the live video feed is shown to the user, and the user and John Smith are able to communicate through the application.

In another embodiment of the current invention, the acquaintance sending the live view is also able to receive the live view from the user as well. The user's face is able to be inserted into the live view if the user has a front-facing camera. This corresponding live view can be shipped automatically, or the acquaintance is able to request it via the applications GUI. The automatic delivery of the corresponding live view is configured in the application's configuration section.

In another embodiment of the current invention, the live video that is sent to the user's smartphone is recorded and automatically sent to social networking sites. Facebook, a popular social networking site allows videos from applications to be sent to the FaceBook site using the video.upload method. This method uploads a video owned by the current session user. In order for the application to be able to send the video, the application must grant the application the "publish_stream" extended permission. Upload limits must be adhered to. A call to video.getUploadLimits( )to determine a particular user's limits. Supported types of videos are:

3g2 (Mobile Video)
3gp (Mobile Video)
3gpp (Mobile Video)
asf (Windows Media Video)
avi (AVI Video)
dat (MPEG Video)
flv (Flash Video)
m4v (MPEG-4 Video)
mkv (Matroska Format)
mod (MOD Video)
mov (QuickTime Movie)
mp4 (MPEG-4 Video)
mpe (MPEG Video)
mpeg (MPEG Video)
mpeg4 (MPEG-4 Video)
mpg (MPEG Video)
nsv (Nullsoft Video)
ogm (Ogg Format)
ogv (Ogg Video Format)
qt (QuickTime Movie)
tod (TOD Video)
vob (DVD Video)
wmv (Windows Media Video)

Utilizing the upload method, the application is able to send the recorded live view from the user's smartphone to the FaceBook social networking site. The user is also able to do other things in the video like tag people in the video, or comment on the video once the video is uploaded on the social networking site.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of FIGS. 1-4.

Figure 7:
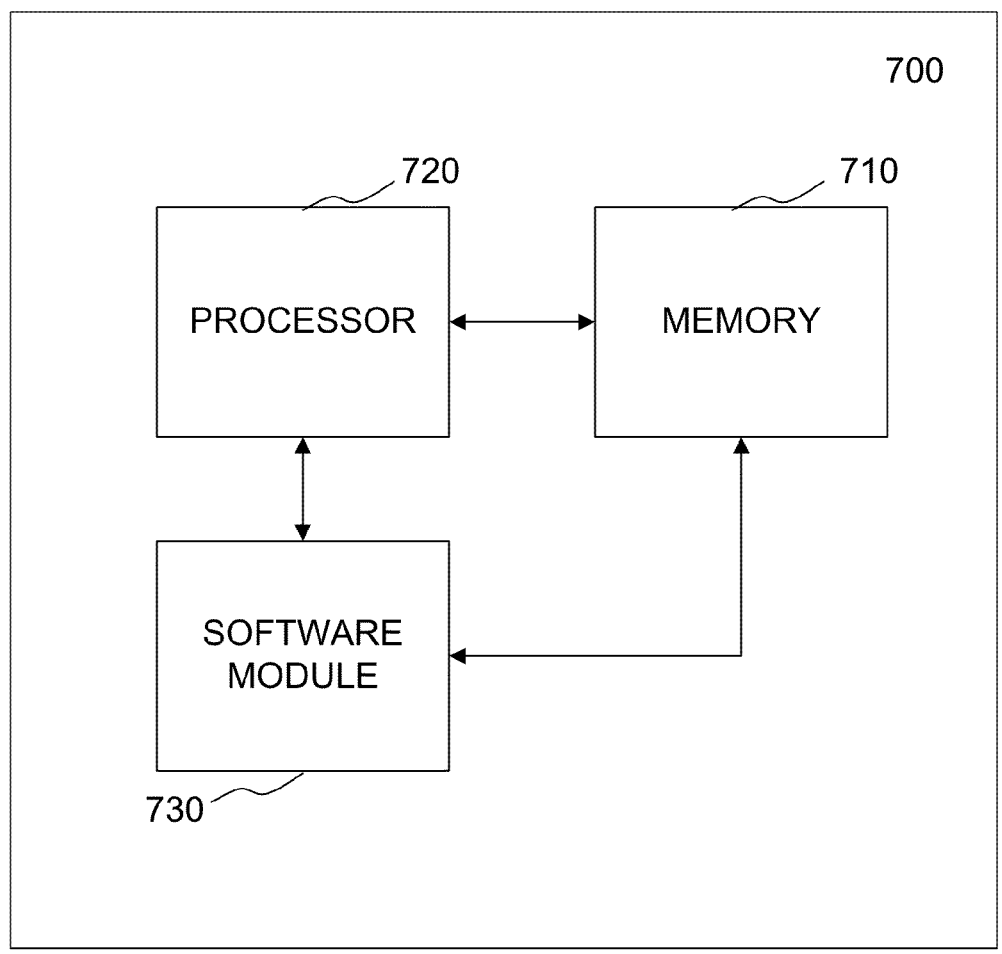
FIG. 7 illustrates an example network entity device configured to store instructions, software, and corresponding hardware for executing the same, according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

What is claimed is:

1. A method of communicating between mobile devices, the method comprising:
    identifying a geographic location of interest associated with a mobile device operated by a user;
    determining a present location of the mobile device;
    determining a present location of at least one additional mobile device being operated by a respective at least one additional user via a location based service (LBS);
    notifying the mobile device when the present location of the at least one additional mobile device is within a predefined threshold distance of a mobile device domain;
    automatically receiving media data captured from the at least one additional mobile device when the present location of the at least one additional mobile device is present in the geographic location of interest and forwarding the received data to the mobile device;
    receiving a confirmation that the mobile device has elected to receive live view information provided by the at least one additional mobile device; and
    transmitting live view information captured from the at least one additional mobile device to the mobile device based on the received media data captured from the at least one additional mobile device.

2. The method of claim 1, wherein the LBS is provided by a global positioning service (GPS).

3. The method of claim 1, wherein the predefined threshold distance is a user defined parameter used to notify the user when the at least one additional mobile device operated by the at least one additional user is within the predefined threshold distance of the mobile device domain, the at least one additional mobile device being identified from a list of acquaintances included in a user defined acquaintance list.

4. The method of claim 1, wherein the notifying the mobile device comprises transmitting a short message service (SMS)

type message to the mobile device indicating that the at least one additional mobile device is currently operating within the mobile device domain.

5. The method of claim 1, wherein the live view information comprises audio and video data based on the media data captured from the at least one additional mobile device.

6. The method of claim 5, wherein the live view information is captured from at least two different cameras operating on the at least one additional mobile device and combined into a single viewable display window and provided to the mobile device.

7. An apparatus configured to communicate between mobile devices, the apparatus comprising:
a processor configured to
identify a geographic location of interest associated with a mobile device operated by a user
determine a present location of the mobile device,
determine a present location of at least one additional mobile device being operated by a respective at least one additional user via a location based service (LBS);
a transmitter configured to notify the mobile device when the present location of the at least one additional mobile device is within a predefined threshold distance of a mobile device domain; and
a receiver configured to automatically receive media data captured from the at least one additional mobile device when the present location of the at least one additional mobile device is present in the geographic location of interest and forward the received data to the mobile device, and also configured to receive a confirmation that the mobile device has elected to receive live view information provided by the at least one additional mobile device, and
wherein the transmitter is also configured to transmit live view information captured from the at least one additional mobile device to the mobile device based on the received media data captured from the at least one additional mobile device.

8. The apparatus of claim 7, wherein the LBS is provided by a global positioning service (GPS).

9. The apparatus of claim 7, wherein the predefined threshold distance is a user defined parameter used to notify the user when the at least one additional mobile device operated by the at least one additional user is within the predefined threshold distance of the mobile device domain, the at least one additional mobile device being identified from a list of acquaintances included in a user defined acquaintance list.

10. The apparatus of claim 7, wherein the transmitter is further configured to notify the mobile device by transmitting a short message service (SMS) type message to the mobile device indicating that the at least one additional mobile device is currently operating within the mobile device domain.

11. The apparatus of claim 7, wherein the live view information comprises audio and video data based on the media data captured from the at least one additional mobile device.

12. The apparatus of claim 11, wherein the live view information is captured from at least two different cameras operating on the at least one additional mobile device and combined into a single viewable display window and provided to the mobile device.

13. A non-transitory computer readable storage medium configured to store instructions that when executed cause a processor to perform communicating between mobile devices, the processor being further configured to perform:
identifying a geographic location of interest associated with a mobile device operated by a user;
determining a present location of the mobile device;
determining a present location of at least one additional mobile device being operated by a respective at least one additional user via a location based service (LBS);
notifying the mobile device when the present location of the at least one additional mobile device is within a predefined threshold distance of a mobile device domain;
automatically receiving media data captured from the at least one additional mobile device when the present location of the at least one additional mobile device is present in the geographic location of interest and forwarding the received data to the mobile device;
receiving a confirmation that the mobile device has elected to receive live view information provided by the at least one additional mobile device; and
transmitting live view information captured from the at least one additional mobile device to the mobile device based on the received media data captured from the at least one additional mobile device.

14. The non-transitory computer readable storage medium of claim 13, wherein the LBS is provided by a global positioning service (GPS).

15. The non-transitory computer readable storage medium of claim 13, wherein the predefined threshold distance is a user defined parameter used to notify the user when the at least one additional mobile device operated by the at least one additional user is within the predefined threshold distance of the mobile device domain, the at least one additional mobile device being identified from a list of acquaintances included in a user defined acquaintance list.

16. The non-transitory computer readable storage medium of claim 13, wherein the notifying the mobile device comprises transmitting a short message service (SMS) type message to the mobile device indicating that the at least one additional mobile device is currently operating within the mobile device domain.

17. The non-transitory computer readable storage medium of claim 13, wherein the live view information comprises audio and video data based on the media data captured from the at least one additional mobile device, and wherein the live view information is captured from at least two different cameras operating on the at least one additional mobile device and combined into a single viewable display window and provided to the mobile device.

* * * * *